US011578149B2

(12) United States Patent
Klots et al.

(10) Patent No.: US 11,578,149 B2
(45) Date of Patent: Feb. 14, 2023

(54) AMMONIA-BASED, IMIDE-CONTAINING RESIN CUTS OF STYRENE-MALEIC RESINS

(71) Applicant: BASF SE, Ludwigshafen (DE)

(72) Inventors: Timothy D. Klots, Plymouth, MI (US); Amirpouyan Sardashti, Ann Arbor, MI (US); Frank Reinhold, Plymouth, MI (US)

(73) Assignee: BASF SE

( * ) Notice: Subject to any disclaimer, the term of this patent is extended or adjusted under 35 U.S.C. 154(b) by 0 days.

(21) Appl. No.: 16/900,252

(22) Filed: Jun. 12, 2020

(65) Prior Publication Data

US 2020/0308387 A1 Oct. 1, 2020

Related U.S. Application Data

(62) Division of application No. 15/777,150, filed as application No. PCT/US2016/061872 on Nov. 14, 2016, now Pat. No. 10,717,857.

(60) Provisional application No. 62/257,527, filed on Nov. 19, 2015.

(51) Int. Cl.
| | | |
|---|---|---|
| *C08F 8/12* | (2006.01) | |
| *C08F 222/06* | (2006.01) | |
| *C08F 8/30* | (2006.01) | |
| *C08F 8/48* | (2006.01) | |
| *C08L 33/12* | (2006.01) | |
| *C08F 120/18* | (2006.01) | |
| *C08L 35/06* | (2006.01) | |
| *C08F 8/44* | (2006.01) | |
| *C08F 220/18* | (2006.01) | |
| *C08L 25/08* | (2006.01) | |

(52) U.S. Cl.
CPC .............. *C08F 8/12* (2013.01); *C08F 8/30* (2013.01); *C08F 8/44* (2013.01); *C08F 8/48* (2013.01); *C08F 120/18* (2013.01); *C08F 220/1802* (2020.02); *C08F 220/1804* (2020.02); *C08F 222/06* (2013.01); *C08L 25/08* (2013.01); *C08L 33/12* (2013.01); *C08L 35/06* (2013.01); *C08F 2800/10* (2013.01); *C08F 2810/50* (2013.01); *C08L 2205/025* (2013.01)

(58) Field of Classification Search
CPC .... C08F 212/08; C08F 222/06; C08F 222/08; C08F 222/40
See application file for complete search history.

(56) References Cited

U.S. PATENT DOCUMENTS

| | | |
|---|---|---|
| 2,565,147 A | 8/1951 | Pfluger |
| 2,944,033 A | 7/1960 | Goodman |
| 3,444,151 A | 5/1969 | Dolton et al. |
| 3,494,979 A | 2/1970 | Pratt |
| 3,509,110 A | 4/1970 | DiGiulio et al. |
| 3,857,803 A | 12/1974 | Shenfeld et al. |
| 3,998,907 A | 12/1976 | DiGiulio |
| 4,040,900 A | 8/1977 | Mazzarella et al. |
| 4,221,697 A | 9/1980 | Osborn et al. |
| 4,243,564 A | 1/1981 | Mavis |
| 4,423,194 A | 12/1983 | Lobach et al. |
| 4,440,884 A | 4/1984 | Jannusch |
| 4,588,786 A | 5/1986 | Kadono et al. |
| 4,623,578 A | 11/1986 | Marchetti et al. |
| 5,565,537 A | 10/1996 | Uda et al. |
| 5,759,249 A | 6/1998 | Wasser |
| 5,994,468 A | 11/1999 | Wang et al. |
| 6,048,930 A | 4/2000 | Wang et al. |
| 6,051,107 A | 4/2000 | Varnell |
| 6,054,532 A | 4/2000 | Wang et al. |
| 6,232,405 B1 | 5/2001 | Schmidhauser et al. |
| 6,401,776 B1 | 6/2002 | Wang et al. |
| 6,407,197 B1 | 6/2002 | Van Den Berg et al. |
| 7,323,505 B2 | 1/2008 | Thibaut |
| 7,812,089 B2 | 10/2010 | Van Den Abbeele et al. |
| 2001/0034393 A1 | 10/2001 | Wang et al. |
| 2003/0091527 A1* | 5/2003 | Wang ................ C08F 8/32 424/70.17 |
| 2004/0002562 A1 | 1/2004 | Schmidhauser et al. |
| 2004/0024135 A1 | 2/2004 | Verge et al. |
| 2004/0054037 A1 | 3/2004 | Abbeele van den et al. |
| 2004/0065425 A1 | 4/2004 | Irwin et al. |
| 2004/0068045 A1 | 4/2004 | Betremieux et al. |
| 2005/0027035 A1 | 2/2005 | Wang et al. |

(Continued)

FOREIGN PATENT DOCUMENTS

| | | |
|---|---|---|
| DE | 17 20 746 A1 | 7/1971 |
| DE | 43 42 157 A1 | 6/1995 |
| EP | 1 060 197 B1 | 6/2004 |
| EP | 1 454 925 A1 | 9/2004 |
| EP | 1 988 066 A2 | 11/2008 |
| JP | 01-094936 A | 4/1989 |

(Continued)

OTHER PUBLICATIONS

European Search Report for EP Patent Application No. 16866917.4, dated Jan. 8, 2020, 4 pages.

(Continued)

*Primary Examiner* — Robert C Boyle

(74) *Attorney, Agent, or Firm* — Faegre Drinker Biddle & Reath LLP

(57) ABSTRACT

A process of preparing an aqueous solution of a cycloimide-containing polymer includes heating an aqueous solution of a cycloanhydride-containing polymer with a first neutralizing agent at a ratio of cycloanhydride to neutralizing agent of about 1:1 to about 1:1.5 at a temperature and for a time sufficient to form the aqueous solution of the cycloimide-containing polymer having a cycloimide to acid group ratio of about 1:2 to about 1.5:2.

9 Claims, 1 Drawing Sheet

(56) References Cited

U.S. PATENT DOCUMENTS

| | | | |
|---|---|---|---|
| 2007/0093610 A1* | 4/2007 | Kim | C08F 212/08 525/333.3 |
| 2010/0029160 A1 | 2/2010 | Srinivasan et al. | |
| 2011/0319567 A1* | 12/2011 | Noguchi | C08L 55/02 525/205 |
| 2012/0302660 A1 | 11/2012 | Stanssens et al. | |
| 2012/0316305 A1* | 12/2012 | Bshena | C08F 8/02 526/262 |

FOREIGN PATENT DOCUMENTS

| | | |
|---|---|---|
| WO | WO-99/45039 | 9/1999 |
| WO | WO-2011/098574 A1 | 8/2011 |
| WO | WO-2014/180704 | 11/2014 |

OTHER PUBLICATIONS

International Search Report and Written Opinion in International Application No. PCT/US2016/061872, dated Feb. 27, 2017 (9 pages).

Notice of Allowance in U.S. Appl. No. 15/777,150, dated Mar. 13, 2020.

* cited by examiner

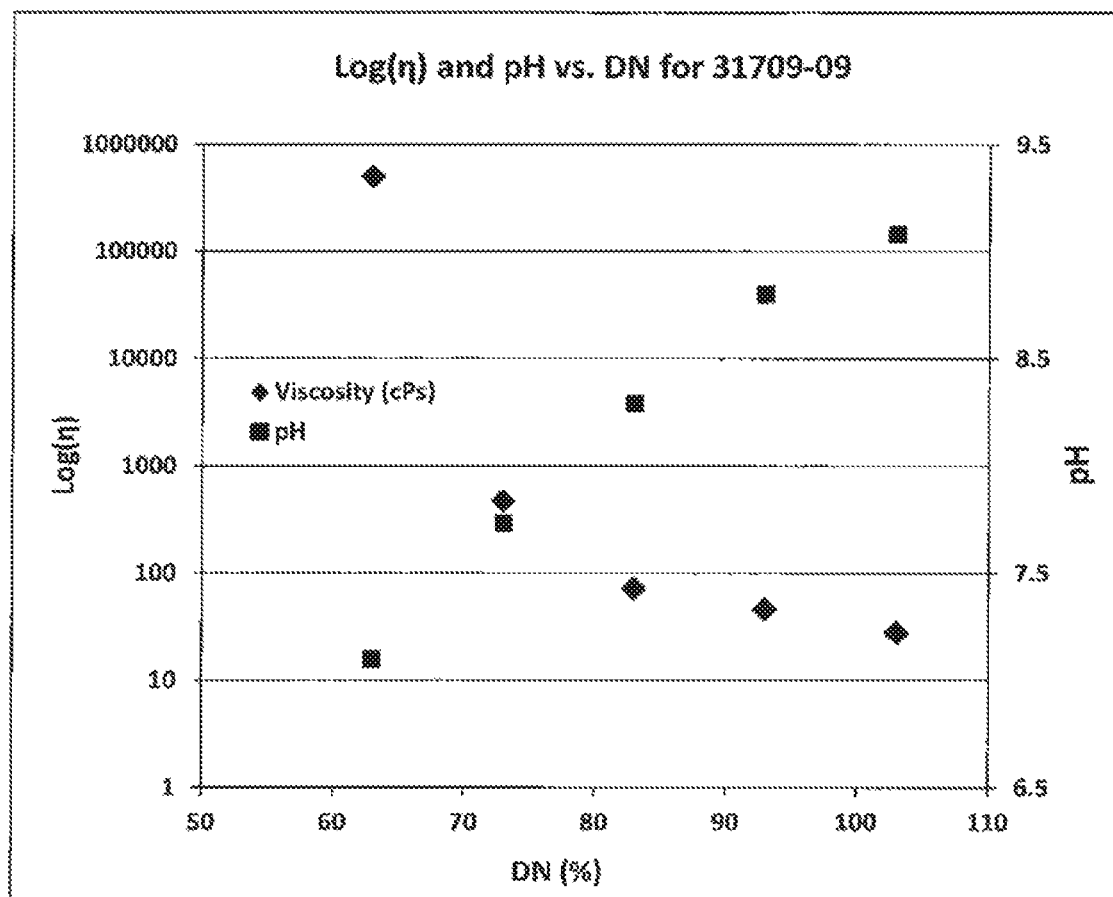

AMMONIA-BASED, IMIDE-CONTAINING RESIN CUTS OF STYRENE-MALEIC RESINS

CROSS-REFERENCE TO RELATED APPLICATIONS

This application is a divisional application of U.S. application Ser. No. 15/777,150 filed on May 17, 2018, which is a U.S. National Phase Application under 35 U.S.C. § 371 of International Application No. PCT/US2016/061872, filed on Nov. 14, 2016, which claims the benefit of and priority to U.S. Provisional Application No. 62/257,527, filed on Nov. 19, 2015, the contents of which are incorporated herein in their entireties.

FIELD

The invention generally relates to the preparation of aqueous solution of styrene-maleic-acrylic resins, and, in particular their use as support resins.

SUMMARY

In one aspect, provided herein are processes of preparing an aqueous solution of a cycloimide-containing polymer, the process including: heating an aqueous solution of a cycloanhydride-containing polymer with a first neutralizing agent at a ratio of cycloanhydride to neutralizing agent of about 1:1 to about 1:1.5 at a temperature and for a time sufficient to form the aqueous solution of the cycloimide-containing polymer having an imide to starting anhydride ratio of about 1:2 to about 1.5:2. In some embodiments, the temperature is about 130° C. to about 155° C. In some embodiments, the ratio of cycloanhydride to neutralizing agent is about 1:1, and the cycloimide to acid group ratio is about 1:2. In some embodiments, the cycloanhydride-containing polymer is a styrene-maleic anhydride polymer. In some embodiments, the styrene-maleic anhydride polymer has a ratio of styrene to maleic anhydride of from about 1:1 to about 3:1. In some embodiments, the cycloanhydride-containing polymer further contains acrylate, methacrylate, or diisobutylene repeat units, or a combination of any two or more thereof. In some embodiments, the process further contains adding a second neutralizing agent to the aqueous solution of the cycloimide-containing polymer at a temperature of less than about 90° C. to form a neutralized polymer. In some embodiments, the first neutralizing agent is an amine represented by the formula $NR^2R^3R^4$, wherein $R^2$, $R^3$, and $R^4$ are independently H, $C_{1-12}$ alkyl, or $C_{1-12}$ aryl. In some embodiments, the first neutralizing agent is $NH_3$. In some embodiments, the second neutralizing agent is an alkali metal hydroxide, alkali metal oxide, alkaline earth metal hydroxide, alkaline earth metal oxide, or an amine represented by the formula $NR^2R^3R^4$, wherein $R^2$, $R^3$, and $R^4$ are independently H, $C_{1-12}$ alkyl, or $C_{1-12}$ aryl. In some embodiments, the second neutralizing agent is NaOH, KOH, or $NH_3$. In some embodiments, the time is from about 1 hour to 5 hours. In some embodiments, the aqueous solution has a pH of from about 7 to about 10. In some embodiments, the imide-containing polymer has a number average molecular weight from about 5,000 g/mol to about 15,000 g/mol. In some embodiments, the aqueous solution of the cycloimide-containing polymer has a viscosity from about 10 cPs to about 500,000 cPs. In some embodiments, the aqueous solution of the cycloimide-containing polymer has a viscosity of from about 10 cPs to about 5,000 cPs. In some embodiments, the cycloimide-containing polymer has a Tg from about 150° C. to about 230° C. In some embodiments, the cycloimide-containing polymer is present in the aqueous solution from about 10 wt % to about 35 wt %. In some embodiments, the cycloimide-containing polymer is present in the aqueous solution from about 25 wt % to about 30 wt %.

In another aspect, provided herein are aqueous solutions of a cycloimide-containing polymer prepared according to the process described herein. In some embodiments, the aqueous solution exhibits an increase in viscosity of less than 20% at ambient temperature for 90 days relative to the viscosity of the aqueous solution upon its preparation.

In another aspect, provided herein are aqueous compositions containing
 (a) a solubilized cycloimide-containing resin formed from comonomers including maleic anhydride and substituted ethylenic comonomers, wherein
  (i) the resin includes a partially neutralized maleamide-acid species; and
  (ii) the resin has an oxygen content of from about 5% to about 30%, an acid value of at least 60 mg KOH/g on dry solids, and an amine base value of at least 60 mg/KOH on dry solids;
  (iii) the resin has a number average molecular weight of about 1,000 D to about 10,000 D; and
  (iv) the substituted ethylenic comonomers include styrene; and
 (b) emulsion particles which constitute 0-80% weight of the total solids.

In some embodiments, the ratio of styrene to maleic anhydride in the average molar repeat unit of the resin is from 1:1 to 5:1. In some embodiments, the substituted ethylenic comonomers further include $C_6$-$C_{20}$ α-olefins; the resin has a percentage of styrene in the comonomer repeat unit of from 0% to 80%; and maleic anhydride is 33% to 50% of the average molar repeat unit of the resin. In some embodiments, the resin further contains hydrolyzed diacid; the maleamide-acid species is partially neutralized by a neutralizing amine; the neutralizing amine contains ammonia or a primary amine; and the resin has a degree of neutralization of the maleamide-acid species and the hydrolyzed diacid of at least 50%. In some embodiments, the resin has a degree of imidization of from about 25% to about 75% relative to the amount of maleic acid monomer present in the resin. In some embodiments, the resin has a degree of imidization of from about 25% to about 50% range relative to the amount of maleic acid monomer present in the resin. In some embodiments, the resin is formed from comonomers including acrylic acid, methacrylic acid, styrene, alpha-methyl styrene and maleic anhydride. In some embodiments, the emulsion particles are formed from initial polymerization of acrylate and styrenic monomers in the presence of a surfactant prior to blending with the resin. In some embodiments, the emulsion particles are formed from polymerization of acrylate and styrenic monomers in the presence of the resin.

In another aspect, provided herein are processes of preparing a resin cut, the process including cutting a resin at a temperature of between 80° C. and 150° C. by introducing the resin to an initial charge of neutralizing amine of from 30% to 80% based on diacid equivalent of maleic anhydride units in the resin, wherein the resin is formed from comonomers including maleic anhydride and styrene; and the resin cut is water-soluble. In some embodiments, 25% to 75% of the maleic anhydride units are imidized. In some embodiments, 25% to 75% of the maleic anhydride units are imidized, and the resin cut has a resultant degree of neutralization of any carboxyl species of from 50% to 100%.

BRIEF DESCRIPTION OF THE DRAWINGS

The FIGURE is a dual axis graph of the viscosity and pH versus degree of neutralization (DN) curves, according to Example 1.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The present application is directed to rheologically stable compositions that are based on maleic co-polymers, as well as methods for such resin compositions. The maleic co-polymers are cut in water with ammonia in a controlled manner so as to form preferential amounts of imide and fully hydrolyzed species, with minimal formation of the amide-acid species.

The methods include producing high-imide-containing resin cuts of vinyl monomer-maleic anhydride resins which exhibit good stability, excellent heat-resistance, and are substantially free of half-amide/half-acid species. Such resin cuts may find utility as resin-supports for secondary monomer polymerization. For example, such resins may be useful in rheology-controlled technologies.

Prior to discussing the process provided herein, a discussion of the conventional process is appropriate here. Aqueous resin cuts of α-olefin or vinyl monomer/maleic anhydride resins can be made using common neutralizing bases, such as ammonia or sodium hydroxide. Products of the resulting cuts generally offer heat-resistant compositions, and they are useful for water-based overprint varnishes and inks. For example, they may find use in inks and coatings for pre-printed corrugated boards. While sodium cuts tend to be too hydrophilic, leading to inferior water resistance, the films made from emulsions made with ammonia-neutralized cuts undergo ring closure upon heat exposure, effectively re-making the composition more hydrophobic. When made conventionally with a 2:1 ratio of ammonia:anhydride at about 90° C. and 1 atm, ammonia-neutralized resin cuts result in opening of the anhydride group into an amide and acid group (half amide/acid species), where the acid group is in the form of an ammonium carboxylate salt. Upon application, the ammonium salt will slowly decompose at room temperature. At modest temperatures (approximately 130° C.), further chemistry may occur, such as the amide-acid species undergoing ring-closure.

FTIR has shown that both imide (when water is the leaving group) and anhydride (when ammonia is the leaving group) form at elevated temperature. The formation of imide leads to an increase in Tg because the imide species is capable of intermolecular hydrogen-bonding. For instance, the resin SMA-1000 (a 1:1 STY-MAH composition) has a Tg of 155° C. in the anhydride form; upon making an ammonia cut (2:1 ammonia:anhydride) and full ring-closure, the Tg increases to 192° C. Because anhydride groups are capable of being H-bond acceptors, there is little further increase in Tg for greater than 50 mol % imide content. The imide therefore confers certain beneficial properties including decreased water resistance, improved heat-resistance, and potentially better adhesion on hydrophobic surfaces.

A critical problem is that direct in-situ imidization can occur already in aqueous solution with time, heat, or both. Thus, ammonia cuts of vinyl monomer/α-olefin [(styrene, diisobutylene)-MAH (maleic anhydride)] begin to ring-close at temperatures as low as 55° C., possibly lower. For instance, it has been found that the acid value (AV) for a 60/40 blend of SMA-2000/SMA-1000, which should have a starting anhydride value (mg KOH/g dry) of 220 on solids, and thus an initial acid value of 220 as well, drops with additional cook time. For instance, at 93° C., the AV is reduced from 209 to 193 in extending the cook time from 4 hours to 7 hours. This small drop in acid value is the result of direct imide formation from the half amide-half acid species. This process results in a disproportionately large change in rheology as the viscosity increases 100-fold during this time. We note that cooking these solutions to 15 hours and 24 hours results in AVs of 170 and eventually 140, and the viscosity continues to increase. Importantly, it was noted that in three-week heat-aging tests at 55° C., 4 hour cuts undergo unacceptable changes in viscosity, and that even at room temperature over long periods of time, we may find instability as well.

The conventional process may be described, without being bound by theory, by the illustration of Scheme 1. In Scheme 1, a ratio of 2:1 ammonia:anhydride is used resulting in ring opening to a fully neutralized amide-acid intermediate. Continued heating may lead to ring closure to a cycloimide-amide-acid resin, which over time increases in viscosity.

Scheme 1

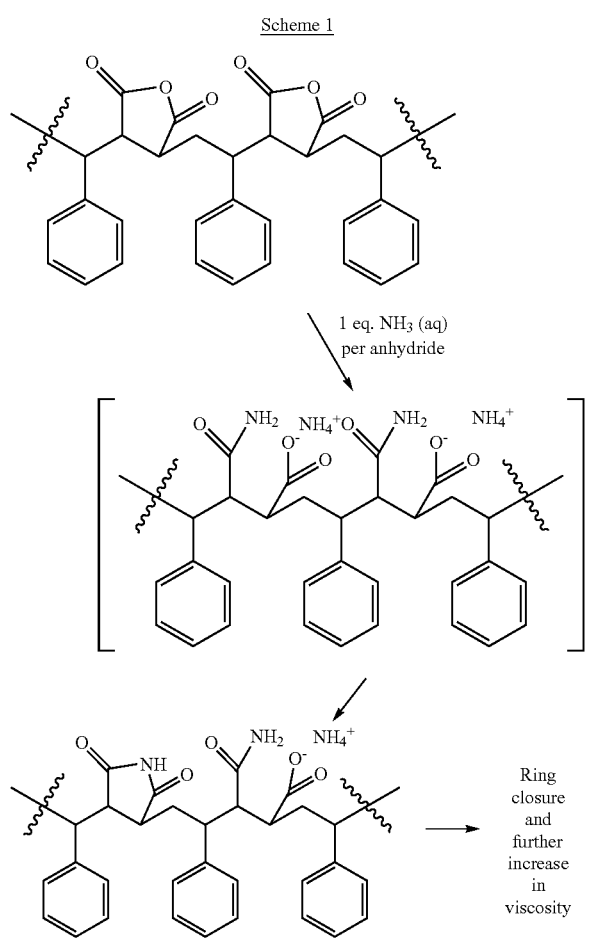

It has now been found that incorporation of pre-formed imide in the resin cut improves the heat-resistance over overprint varnishes, especially over aluminum flake inks. Thus, the present method provides for pre-forming the desired imide content, and then stopping, or at least substantially abating further imidization within the polymer, to prevent or substantially decrease subsequent increases in viscosity during the pot life of the resin cut.

It has been surprisingly determined that charging a lesser amount of amine neutralizing agent, based on anhydride content, and then heating under pressure in an autoclave at a temperatures from about 130° C. to about 155° C. results in a composition that contains the desired amount of imide (approximately 50 mol % on anhydride), the balance containing little or no amide but mostly the hydrolyzed dicarboxyl species at a modest degree of neutralization ("DN"), based on the neutralizing agent balance. Addition of further neutralizing agent at lower temperature (e.g. less than about 90° C.) results in neutralization of the acid groups, a substantial drop in viscosity, and importantly, no amide content in the resin. The resulting neutralized solution is referred to as a "resin cut." Such resins cuts provide good viscosity stability over time. Differential scanning calorimetry (DSC) has shown that the resulting species exhibit acceptable Tg increase and heat-resistance. Therefore, we find that it is possible to make resin cuts with high imide content, which provide good heat resistance properties but at the same time do not have high viscosity during production and viscosity stability overtime.

Other advantages include, but are not limited to, reduced production times compared to conventional technologies (e.g. approximately 1 hour at 155° C., or approximately 3 hours at 135° C.); design of new dispersants based on a combination of alkyl amines/ammonia; neutralization and partial neutralization with tertiary amines to improve adhesion on hydrophobic substrates; faster build-up in heat-resistance due to lower initial salt content; use of the produced resins for novel polymerization support purposes; design of high glass transition (Tg) resins, and improved adhesion due to the bidentate nature of the resin.

In some embodiments, the resin has an average number molecular weight of about 1,000 Daltons (D) to about 10,000 D. This includes an average number molecular weight of about 1,000 D to about 9,000 D; an average number molecular weight of about 1,000 D to about 8,000 D; an average number molecular weight of about 1,000 D to about 7,000 D; an average number molecular weight of about 1,000 D to about 6,000 D; an average number molecular weight of about 1,000 D to about 5,000 D; an average number molecular weight of about 1,000 D to about 4,000 D; an average number molecular weight of about 2,000 D to about 10,000 D; an average number molecular weight of about 2,000 D to about 9,000 D; an average number molecular weight of about 2,000 D to about 8,000 D; an average number molecular weight of about 2,000 D to about 7,000 D; an average number molecular weight of about 2,000 D to about 6,000 D; and an average number molecular weight of about 2,000 D to about 5,000 D. In some embodiments, the average number molecular weight is about 1,000; 2,000; 3,000; 4,000; 5,000; 6,000; 7,000; 8,000; 9,000; or 10,000 D, including increments therein.

In another aspect, provided herein are aqueous compositions containing a solubilized resin described herein and emulsion particles. In some embodiments, provided herein are aqueous compositions containing
(a) a solubilized cycloimide-containing resin formed from comonomers including maleic anhydride and substituted ethylenic comonomers, wherein
  (i) the resin contains a partially neutralized maleamide-acid species; and
  (ii) the resin has an oxygen content of from about 5% to about 30%, an acid value of at least 60 mg KOH/g on dry solids, and an amine base value of at least 60 mg/KOH on dry solids;
  (iii) the resin has a number average molecular weight of about 1,000 D to about 10,000 D; and
  (iv) the substituted ethylenic comonomers include styrene; and
(b) emulsion particles which constitute 0-80% weight of the total solids.

In some embodiments, the ratio of styrene to maleic anhydride in the average molar repeat unit of the resin is from 1:1 to 5:1. This includes a ratio of styrene to maleic anhydride in the average molar repeat unit of the resin of from 1:1 to 4:1, from 1:1 to 3:1; and from 1:1 to 2:1. In some embodiments, the ratio of styrene to maleic anhydride in the average molar repeat unit of the resin is 1:1, 2:1, 3:1, 4:1, or 5:1, including increments therein.

In some embodiments, the substituted ethylenic comonomers consist of or consist essentially of styrene. In some embodiments, the substituted ethylenic comonomers further include $C_6$-$C_{20}$ α-olefins. In some embodiments, the substituted ethylenic comonomers do not include diisobutylene. In some embodiments, the substituted ethylenic comonomers further include $C_6$-$C_{20}$ α-olefins and do not include diisobutylene. In some embodiments, the substituted ethylenic comonomers consist of or consist essentially of styrene and $C_6$-$C_{20}$ α-olefins and do not include diisobutylene.

In some embodiments, the resin has a percentage of styrene in the comonomer repeat unit of from 0% to 80%. This includes a percentage of styrene in the comonomer repeat unit of from 0% to 75%, from 0% to 70%, from 0% to 65%, from 0% to 60%, from 0% to 55%, from 0% to 50%, from 5% to 75%, from 5% to 70%, from 5% to 65%, from 5% to 60%, from 5% to 55%, from 5% to 50%, from 10% to 75%, from 10% to 70%, from 10% to 65%, from 10% to 60%, from 10% to 55%, and from 10% to 50%, including incremental ranges therein. In some embodiments, the resin has a percentage of styrene in the comonomer repeat unit of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80%, including increments therein.

In some embodiments, the resin is formed from comonomers including acrylic acid, methacrylic acid, styrene, alpha-methyl styrene and maleic anhydride. In some embodiments, the resin is formed from comonomers consisting essentially of acrylic acid, methacrylic acid, styrene, alpha-methyl styrene and maleic anhydride.

In some embodiments, maleic anhydride is 33% to 50% of the average molar repeat unit of the resin. This includes ranges of 33% to 45%, 33% to 40%, 35% to 50%, 35% to 45%, 35% to 40%, 40% to 50%, or 45% to 50%. In some embodiments, maleic anhydride is 33%, 34%, 35%, 36%, 37%, 38%, 39%, 40%, 41%, 42%, 43%, 44%, 45%, 46%, 47%, 48%, 49% or 50%, including increments therein, of the average molar repeat unit of the resin.

As used herein, unless otherwise denoted, a "partially neutralized" refers to more than 0% neutralization but less than 100% neutralization. In some embodiments, "partially neutralized" refers to about 1% to about 99% neutralization. This includes from about 5% to about 99% neutralization, from about 5% to about 95% neutralization, from about 5% to about 90% neutralization, from about 5% to about 85% neutralization, from about 5% to about 80% neutralization, from about 5% to about 75% neutralization, from about 5% to about 60% neutralization, from about 5% to about 50% neutralization, from about 10% to about 99% neutralization, from about 10% to about 95% neutralization, from about 10% to about 90% neutralization, from about 10% to about 85% neutralization, from about 10% to about 80% neutralization, from about 10% to about 75% neutralization, from about 10% to about 60% neutralization, from about 10% to about 50% neutralization, from about 20% to about 99% neutralization, from about 20% to about 95% neutralization, from about 20% to about 90% neutralization, from about 20% to about 85% neutralization, from about 20% to about 80% neutralization, from about 20% to about 75% neutralization, from about 20% to about 60% neutralization, from about 20% to about 50% neutralization, from about 30% to about 99% neutralization, from about 30% to about 95% neutralization, from about 30% to about 90% neutralization, from about 30% to about 85% neutralization, from about 30% to about 80% neutralization, from about 30% to about 75% neutralization, from about 30% to about 60% neutralization, from about 30% to about 50% neutralization, from about 50% to about 99% neutralization, from about 50% to about 95% neutralization, from about 50% to about 90% neutralization, from about 50% to about 85% neutralization, from about 50% to about 80% neutralization, from about 50% to about 75% neutralization, from about 75% to about 99% neutralization, from about 75% to about 95% neutralization, or from about 75% to about 90% neutralization. In some embodiments, "partially neutralized" refers to about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% neutralization, including increments therein. In some embodiments, "partially neutralized" refers to at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% neutralization. In some embodiments, the percentage of neutralization is referred to as degree of neutralization.

In some embodiments, the maleamide-acid species is partially neutralized by a neutralizing amine. In further embodiments, the neutralizing amine includes ammonia or a primary amine. In some embodiments, the neutralizing amine consists essentially of or consists of ammonia or a primary amine.

In some embodiments, the resin has an oxygen content of about 5% to about 30%. This includes an oxygen content of from about 5% to about 25%, from about 5% to about 20%, from about 5% to about 15%, from about 5% to about 10%, from about 10% to about 30%, from about 10% to about 25%, from about 10% to about 20%, from about 15% to about 30%, from about 15% to about 25%, or from about 20% to about 30%. In some embodiments, the resin has an oxygen content of about 5, 6, 7, 8, 9, 10, 11, 12, 13, 14, 15, 16, 17, 18, 19, 20, 21, 22, 23, 24, 25, 26, 27, 28, 29, or 30%, including increments therein.

In some embodiments, the resin has an acid value of at least 60 mg KOH/g on dry solids. This includes an acid value of at least 65, 70, 75, or 80 mg KOH/g on dry solids.

In some embodiments, the resin has an amine base value of at least 60 mg KOH/g on dry solids. This includes an amine base value of at least 65, 70, 75, or 80 mg KOH/g on dry solids.

In some embodiments, the resin has a degree of imidization of from about 25% to about 75% relative to the amount of maleic acid monomer present in the resin. This includes a degree of imidization of from about 25% to about 70%, from about 25% to about 65%, from about 25% to about 60%, from about 25% to about 55%, from about 25% to about 50%, from about 25% to about 45%, from about 25% to about 40%, from about 35% to about 75%, from about 35% to about 70%, from about 35% to about 65%, from about 35% to about 60%, from about 35% to about 55%, from about 35% to about 50%, from about 35% to about 45%, from about 35% to about 40%, from about 50% to about 75%, from about 50% to about 70%, from about 50% to about 65%, or from about 50% to about 60% relative to the amount of maleic acid monomer present in the resin. In some embodiments, the resin has a degree of imidization of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75%, including increments therein, relative to the amount of maleic acid monomer present in the resin.

In some embodiments, the emulsion particles constitute 0-80% weight of the total solids of the aqueous composition. This includes 0-75%, 0-70%, 0-65%, 0-60%, 5-80%, 5-75%, 5-70%, 5-65%, 5-60%, 10-80%, 10-75%, 10-70%, 10-65%, 10-60%, 15-80%, 15-75%, 15-70%, 15-65%, 15-60%, 20-80%, 20-75%, 20-70%, 20-65%, 30-80%, 30-75%, 30-70%, 30-65%, 50-80%, 50-75%, 50-70%, 60-80%, or 70-80% weight of the total solids of the aqueous composition. In some embodiments, the emulsion particles constitute about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% weight of the total solids of the aqueous composition.

In some embodiments, the emulsion particles are formed from initial polymerization of acrylate and styrenic monomers in the presence of a surfactant prior to blending with the resin. In some embodiments, the emulsion particles are formed from polymerization of acrylate and styrenic monomers in the presence of the resin.

In one aspect, a process is provided for preparing an aqueous solution of a cycloimide-containing polymer. The process includes heating an aqueous solution of a cycloanhydride-containing polymer with a first neutralizing agent at a ratio of cycloanhydride to neutralizing agent of about 1:1 to about 1:1.5 at a temperature and for a time sufficient to form the aqueous solution of the cycloimide-containing polymer having a cycloimide to acid group ratio of about 1:2 to about 1.5:2. The temperature of the heating may be from about 130° C. to about 155° C.

In any of the above embodiments, the feed ratio of cycloanhydride to neutralizing agent is about 1:1. Such embodiments may be represented by Scheme 2 which, and without being bound by theory, is believed to be the mechanism through which the cycloimide containing polymer is prepared. Scheme 2 illustrates neutralization of a styrene, cycloanhydride-containing resin progressing through a ring-opened intermediate having both amide and acid groups. Although the acid groups are formally shown as acid groups, it is likely that they are in fact partially neutralized with an ammonium counterion. Thus, upon neutralization there is an initial ring opening of the cycloanhydride to an amine-acid, while other anhydrides are simply hydrolyzed. Ring-closure to the cycloimide then occurs within the amide-acid pairing. As noted in Scheme 2, the resin is stable toward viscosity increases. It is believed that such viscosity increases are at least in part due to formation of other cycloimide groups. As there may be some formation of such groups, or ring closure to other cycloanhydride groups, the stability is not absolute, but the rate at which such ring closure occur is substantially low and substantial viscosity increases are not observed, even at elevated temperatures of 150° C.

In any of the above embodiments, the cycloanhydride-containing polymer may be a styrene-maleic anhydride polymer, or an α-methylstyrene-maleic anhydride polymer. Within the cycloanhydride-containing polymer, a ratio of styrene or α-methylstyrene to cycloanhydride may be from about 1:1 to about 3:1. This includes a ratio of about 1:1.

The cycloanhydride-containing polymer may include other repeat unit groups as well that are derived from acrylate, methacrylate, diisobutylene, and other α-olefin monomers, or a combination of any two or more thereof. In some embodiments, the cycloanhydride-containing polymer does not include diisobutylene repeat units. Thus, the overall cycloanhydride-containing polymer may include a styrene-acrylate-maleic anhydride resin, an α-methylstyrene-acrylate-maleic anhydride resin, a styrene-methacrylate-maleic anhydride resin, an α-methylstyrene-methacrylate-maleic anhydride resin, a styrene-acrylate-maleic anhydride resin, an α-methylstyrene-acrylate-maleic anhydride resin, a styrene-diisobutylene-maleic anhydride resin, an α-methylstyrene-diisobutylene-maleic anhydride resin, or a combination of any two or more thereof.

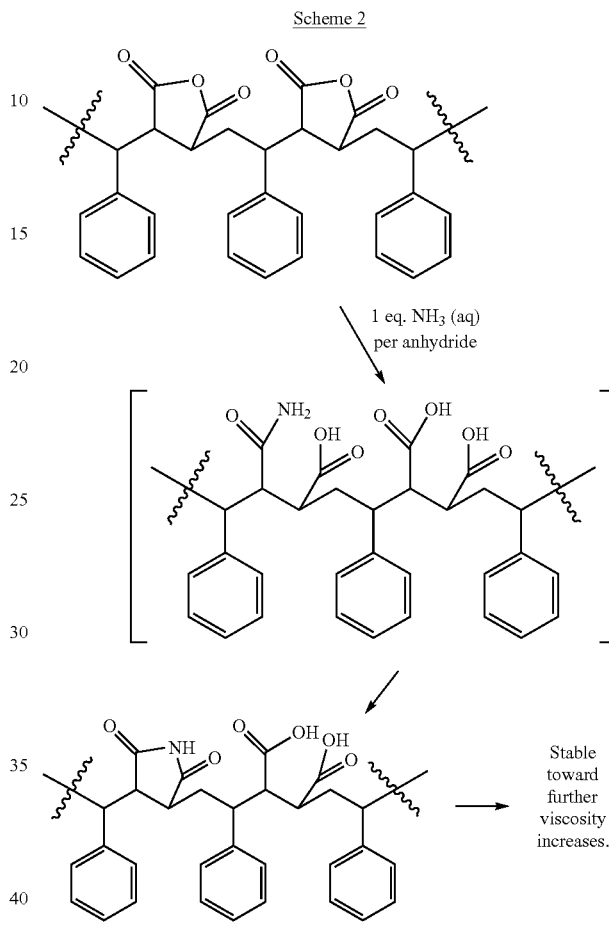

The process may also include a second neutralization step at the same temperature as the first neutralization, or at a lower temperature. In any of the above embodiments, the second neutralization may be conducted at a temperature from about 50° C. to about 130° C. This includes a temperature of about 70° C. to about 120° C., or from about 80° C. to about 110° C. In any of the above embodiments, the temperature for the second neutralization may be about 90° C.

The first neutralization agent may be an amine represented by the formula $NR^2R^3R^4$. In the formula, $R^2$, $R^3$, and $R^4$ are independently H, $C_{1-12}$ alkyl, or $C_{1-12}$ aryl. In any of the above embodiment, the first neutralizing agent may be $NH_3$.

The second neutralization agent, or neutralizing agent, may be an alkali metal hydroxide, alkali metal oxide, alkaline earth metal hydroxide, alkaline earth metal oxide, or an amine represented by the formula $NR^2R^3R^4$. Where the second neutralization agent is an amine, $R^2$, $R^3$, and $R^4$ are independently H, $C_{1-12}$ alkyl, or $C_{1-12}$ aryl. In some embodiments, the second neutralizing agent is NaOH, KOH, or $NH_3$.

As noted above, the process is to be conducted for a time sufficient to form the aqueous solution of the cycloimide-containing polymer. This time frame may be widely varied as the specific repeat units and compositions of the polymer change. However, in some embodiments, the time may be from about 1 hour to 5 hours.

The final pH of the aqueous solution aids in determining the stability of the solution. The pH of the aqueous solution therefore has a pH of from about 7 to about 10. In some embodiments, the pH is from 8 to 9.

In the cycloimide-containing polymer, the molecular weight may be varied, Lower molecular weights are preferred to avoid increases in viscosity due to increased molecular weight. Accordingly, in any of the above embodiments, the imide-containing polymer may have a weight average molecular weight from about 5,000 g/mol to about 15,000 g/mol.

In some embodiments, provided herein are processes of preparing a resin cut, the process including cutting a resin at a temperature of between 80° C. and 150° C. by introducing the resin to an initial charge of neutralizing amine of from 30% to 80% based on diacid equivalent of maleic anhydride units in the resin, wherein the resin is formed from comonomers including maleic anhydride and styrene; and the resin cut is water-soluble. In further embodiments, 25% to 75% of the maleic anhydride units are imidized. In some embodiments, 25% to 75% of the maleic anhydride units are imidized, and the resin cut has a resultant degree of neutralization of any carboxyl species of from 50% to 100%.

As noted above, the process provides for an aqueous solution having viscosity that does not, or resists, increase over time. The target viscosity for the aqueous solution may be such that it is workable as a base resin for the preparation of other coatings and compositions. In some embodiments, the aqueous solution of the cycloimide-containing polymer has a viscosity from about 10 cPs to about 500,000 cPs. In other embodiments, the aqueous solution of the cycloimide-containing polymer may have a viscosity from about 100 cPs to about 5,000 cPs. Viscosity of the aqueous solution is also determined by the amount of cycloimide-containing polymer that is present in the aqueous solution. In any of the above embodiments, the amount of cycloimide-containing polymer that is present in the aqueous solution may be from about 10 wt % to about 35 wt %. This includes the cycloimide-containing polymer being present in the aqueous solution from about 25 wt % to about 30 wt %.

Another measure of the polymer properties are the glass transition temperature of the resultant polymers. In the above process, the cycloimide-containing polymer may have a Tg from about 130° C. to about 230° C. In some embodiments of the above process, the cycloimide-containing polymer may have a Tg from about 150° C. to about 230° C.

In another aspect, an aqueous solution of any of the above cycloimide-containing polymers is provided. The aqueous solution may be described by reference to the cycloimide-containing polymer described above. The aqueous solution may be described in terms of its viscosity or in terms of its resistance to viscosity increases over time. For example, the aqueous solution may exhibit an increase in viscosity of less than 20% at ambient temperature for 90 days relative to the viscosity of the aqueous solution upon its preparation. In some embodiments, the actual viscosity is less important than viscosity stability. Since measured viscosity is a strong function of absolute solids, the solution viscosity can simply be reduced via dilution. However, once reduced, it is undesirable to the formulator if the viscosity increases further by some thickening mechanism. In particular, it is typically undesirable if the viscosity increase is such that $[\eta_{t=90}/\eta_{t=0}]$ is >1.2, where $\eta_{t=90}$ is the viscosity after 90 days. Further, the aqueous solution may be a styrene cycloimide-containing polymer prepared from a styrene cycloanhydride-containing polymer, wherein the aqueous solution contains up to 30 wt % of the cycloimide-containing polymer and exhibits an increase in viscosity of less than 20% at ambient temperature for 90 days relative to the viscosity of the aqueous solution upon its preparation.

The present embodiments, thus generally described, will be understood more readily by reference to the following examples, which are provided by way of illustration and are not intended to be limiting of the present technology in any way.

EXAMPLES

General.

In the examples that follow, SMA-1000 is a styrene maleic anhydride (MAH) polymer having a ratio of styrene to MAH of 1:1, and SMA-2000 is a styrene maleic anhydride (MAH) polymer having a ratio of styrene to MAH of 2:1

Example 1

Water (3729.5 g), a 60/40 blend of SMA-2000/SMA-1000 (1000 g, containing 3.92 moles of anhydride) were charged to a reactor along with 270.5 g of 28% aqueous ammonia (4.4 mol). The charged total mas of 5000.0 g contained 20% solids. The calculated degree of neutralization ("DN") was 56.7% NH$_3$ on fully hydrolyzed anhydride. The mixture was cooked for 1 hour at 155° C. The resulting mixture had a pH of 7.1 and a viscosity of 500,000 cPs.

Four 100 g samples were then mixed with successively increasing aliquots of aqueous NH$_3$ (for further neutralization) at the rate of 0.56 g per 100 g. The viscosity and pH versus DN curves are shown in the FIGURE.

The wet sample (20.0% solids) was titrated in triplicate for remaining base (either NH$_3$ or COO$^-$). A wet base value (BV) of 28.8 was obtained. On dry solids the BV is 143.8. The calculated percent of imide substitution is 48.0%, assuming the ammonia strength to be 28% and no amide. The estimated DN on remaining carboxyl was 63%.

The resin was further neutralized and used to make a resin-supported emulsion, which was then used to prepare a hot-mar, over-print varnish. The samples were tested at 54% and 64% resin on overall (46% and 36% acrylic emulsion) solids.

Example 2

SMA-1000 resin (1250 g) was charged to a reactor, followed by aqueous ammonia (428.6 g; assumed 28.0% by weight active) and water (3324 g) to a total mass of 5000.0 g. The sample was cooked under agitation in the autoclave for 1 hour at 155° C. The resulting resin cut had a pH of 7.47 and an initially measured viscosity of 88,000 cPs. The measured Tg was 196.4° C. The product had 25% solids and a 56.7 DN NH$_3$.

The sample was titrated in triplicate and a wet BV of 43.0 was obtained, corresponding to an imidization of 51.3% on charged anhydride. The DN of the remaining ammonia on carboxyl was calculated at 63.8%, assuming no amide formation.

Example 3

Similar to Example 2, except the temperature was 130° C., and samples were pulled at 1 and 2 hours before concluding at 3 hours total cook time. Each sample was tested for pH, viscosity, and AV. The Tg for the 2-hour sample was measured by DSC to be 192.8° C. measurement via DSC. The product contained 25% solids with 56.7 DN (degree of neutralization) $NH_3$.

Example 4

Reaction of an SMA blend (60/40) (SMA2000/1000) at 24.0% charged solids with 56.7 DN ammonia at 155 0° for 1 hour, then post-neutralized to 90 DN on carboxyl. This trial was similar to Example 1, except that 80.0 g of aqueous ammonia was added to the resin cut after lowering the reactor temperature to 75° C.

Water (3475.5 g), a 60/40 blend of SMA-2000/SMA-1000 (1200 g; containing 4.71 moles of anhydride) were charged to a reactor along with 324.5 g of 28% aqueous ammonia (4.4 mol). The charged total mass of 5000.0 g contained 24% solids. The reactor was held at 155° C. for 1 hour and then cooled to 75° C. After removal of a 100 g sample, 80.0 g of $NH_3$ (aq) was added to make the final solids to 23.6%. The pH was 8.5 and the final viscosity was 30,000 cPs. Utilizing the calculated final solids of 23.6% and measured wet base value of 46.8, the degree of imidization was derived to be 51.3%. The calculated DN on remaining carboxyl was estimated to be 92.5 DN.

Example 5

To a 1000 mL emulsion reactor equipped with a condenser, stirrer, and nitrogen purge, was added 397.6 g of the autoclave resin cut of Example 1 (at 20% solids) and 6.5 g of aqueous ammonia (used to adjust the degree of neutralization to approximately 90%). The reactor was then heated to 80° C., followed by addition of 1.4 g of ammonium persulfate (APS) dissolved in 18.6 g of deionized water (DIW), and the resultant mixture held for 3 minutes before beginning a monomer feed of 47.7 g of methyl methacrylate (MMA) and 190.9 g of ethyl acrylate (EA). The monomer feed was pumped into the reactor at a rate of 2.65 g/min over 90 minutes. At 45 minutes into the monomer feed, an APS co-feed was started (co-feed containing 0.35 g APS and 35.7 g water). The APS co-feed was pumped into the reactor at a rate of 0.72 g/min over 50 minutes. After 95 minutes when both the monomer feed and ammonium persulfate co-feed had ended, each line was flushed with 15.5 g of water.

The reactor was held at 80° C. for an additional 30 minutes. 1.0 g of Fe(II)-EDTA solution (prepared from 0.5 g Fe(II)sulfate, 0.3 g ethylenediaminetetracetic acid (EDTA) in 100 g deionized water (DIW)) was pipetted into the reactor, followed by 19.2 g t-BHP (t-butyl hydroperoxide) solution (1 g t-BHP/18.2 g DIW) added to the reactor at a pump rate of 0.96 g/min, with a simultaneously co-feed of 19.0 g isoascorbic acid (IAA) (1.0 g IAA/16.2 g DIW/1.8 g NH3(aq)) pumped at a rate of 0.95 g/min. Both lines were flushed with 7.8 g DIW. The reactor was then cooled to 25° C. and the emulsion was filtered through a 100 micron filter bag. The resulting emulsion had a pH of 7.0, an initially measured viscosity of 634 cPs. The measured solids was 40.0% and the particle sizes were $D_v$=140 nm and $D_n$=111 nm, where $D_v$ is the volume average particle diameter, and $D_n$ is the number average particle diameter.

A blend was then made using the emulsion of Example 5 and a resin cut from Example 1. The blend was made using a bench top mixer equipped with a mixing blade. In a beaker containing 317.9 g of Example 1, 250.0 g of emulsion from Example 5 was added over 15 minutes under constant agitation until the emulsion and resin became a homogenous solution. The resulting blend had a pH of 8.3, an initially measured viscosity of 35 cPs, and solids of 28.95%.

A second blend was then made using the emulsion of Example 5 and a resin cut of Example 1. The blend was made using a bench top mixer equipped with a mixing blade. In a beaker containing 398.7 g of Example 1, 180.0 g of the emulsion of Example 5 was added over 15 minutes under constant agitation until the emulsion and resin became a homogenous solution. The resulting blend had a pH of 8.5, an initially measured viscosity of 32 cPs, and a measured solids of 26.4%.

Example 6

To a 1000 mL emulsion reactor equipped with a condenser, stirrer, and nitrogen purge, were added 38.8 g of DIW and 396.7 g of the autoclave resin cut of Example 4 (at 23.6% solids/degree of neutralization of about 85%). The reactor was then heated to 80° C. Then 1.7 g of APS dissolved in 9.6 g of DIW was charged and held for 3 minutes before beginning the monomer feed of 57.1 g of MMA and 228.6 g of EA. The monomer feed was pumped into the reactor at a rate of 3.17 g/min over 90 minutes. At 45 minutes into the monomer feed, an APS co-feed was started (co-feed containing 0.41 g APS and 42.8 g water). The APS co-feed was pumped into the reactor at a rate of 0.86 g/min over 50 minutes. After 95 minutes when both the monomer feed and ammonium persulfate co-feed had ended, each line was flushed with 9.6 g of water. The reactor was held at 80° C. for an additional 30 minutes. A solution of 1.1 g of Fe(II)-EDTA (prepare from 0.5 g Fe(II)sulfate and 0.3 g EDTA in 100 g DIW) was pipetted into the reactor, followed by 10.9 g t-BHP solution (1.3 g t-BHP/9.6 g DIW) at a pump rate of 0.54 g/min, and a simultaneous co-feed of 12.8 g isoascorbic acid (1.1 g IAA/9.6 g DIW/2.1 g $NH_3$ aq) at a rate of 0.64 g/min. Both lines were flushed with 4.8 g DIW.

The reactor was then cooled to 25° C. and the emulsion was filtered through a 100 micron filter bag. The resulting emulsion had a pH of 7.2, an initially measured viscosity of 360,000 cPs, a measured solids of 45.8% (calculated 46.0%) and measured particle sizes of Dv=160 nm, Dn=133 nm.

A blend was then made using the emulsion in Example 6 and the resin of Example 4. The blend was made using a bench top mixer equipped with a mixing blade. In a beaker, to 418.3 g of Example 4 and 18.5 g water, 350.0 g of the emulsion of Example 6 was added over 15 min under agitation until the emulsion and resin became a homogenous solution. 29 g of water was added to lower the solids to 31.50% (theoretical). The resulting blend had a pH of 7.8, an initial measured viscosity of 1010 cPs, and measured solids of 31.7%.

A second blend was then made using the emulsion in Example 6 and the resin of Example 4. The blend was made using a bench top mixer equipped with a mixing blade. To a beaker containing 520.3 g of Example 4 and 23.0 g water, 250.0 g of the emulsion of Example 6 was added over 15 min under agitation until the emulsion and resin became a homogenous solution. 22 g of water was then added to lower the solids to 28.5% (theoretical). The resulting blend had a pH of 7.7, an initially measured viscosity of 1200 cPs, and a measured solids of 32.0%.

Example 7

To a 1000 mL emulsion reactor equipped with a condenser, stirrer, and nitrogen purge, 77.6 g of DIW, 444.7 g of autoclave resin cut Example (at 25% solids), and 6.9 g NH₃ aq.) (used to adjust the degree of neutralization about 85%) was added. The reactor was then heated to 80° C. At temperature, 2.0 g of ammonium persulfate (APS) dissolved in 11.2 g of DIW was charged and held for 3 minutes before beginning the monomer feed of 66.7 g MMA and 266.9 g EA. The monomer feed was pumped into the reactor at a rate of 3.17 g/min over 90 minutes. At 45 minutes into the monomer feed, an APS co-feed was started (co-feed containing 0.5 g APS and 49.9 g water). The APS co-feed was pumped into the reactor at a rate of 1.01 g/min over 50 minutes. After 95 minutes when both the monomer feed and the APS co-feed had ended, each line was flushed 11.2 g of water. The reactor was held at 80° C. for an additional 30 minutes. A solution of 1.32 g of Fe(II)-EDTA (prepared from 0.5 g Fe(II)sulfate and 0.3 g EDTA in 100 g water) was pipetted into the reactor followed by 12.7 g t-BHP solution (1.5 g t-BHP/11.2 g DIW) at a pump rate of 0.63 g/min, and a simultaneously co-feed of 15 g isoascorbic acid (1.3 g IAA/11.2 g DIW/2.5 g NH₃ (aq)) pumped at a rate of 0.75 g/min. Both lines were flushed with 5.6 g DIW. The reactor was then cooled to 25° C. and the emulsion was filtered through a 100 micron filter bag. The resulting emulsion had a pH of 7.3, an initial measured viscosity of 790 cPs, a measured solids of 44.1%, and a measured particle size of $D_v$=98 nm, $D_n$=81 nm.

A blend was made using the emulsion in Example 7 and the resin of Example 2. The blend was made using a bench top mixer equipped with a mixing blade. In a beaker, 674.0 g of the Example 2 resin was measured, over 15 min 350.0 g of emulsion Example 7 was added under agitation until the emulsion and resin became a homogenous solution. The resulting blend had a pH of 8.3, an initial measured viscosity of 145 cPs, and measured solids of 32% (calculated 30.7%).

Example 8

To a 1000 mL emulsion reactor equipped with a condenser, stirrer, and nitrogen purge, 494.3 g of autoclave resin cut Example 4 (at 22.6% solids/degree of neutralization of about 85%) was added along 24.7 g DIW. The reactor was then heated to 80° C.; once the reactor reached temperature, 2.0 g of ammonium persulfate (APS) dissolved in 11.4 g of DIW was charged and held for 3 minutes before beginning the monomer feed of 153.5 g of styrene (STY) and 187.6 g of butyl acrylate (BA). The monomer feed was pumped into the reactor at a rate of 3.79 g/min over 90 minutes. At 45 minutes into the monomer feed, an APS co-feed was started (co-feed containing 0.5 g APS and 51.1 g water). The APS co-feed was pumped into the reactor at a rate of 1.03 g/min over 50 minutes. After 95 minutes, when both the monomer feed and ammonium persulfate co-feed had ended, each line was flushed 11.4 g of water. The reactor was held at 80° C. for an additional 30 minutes. A solution of 1.35 g of Fe(II)-EDTA (prepared from 0.5 g Fe(II)sulfate, 0.3 g EDTA, with 100 g) was pipetted into the reactor; this was followed by 12.9 g t-BHP solution (1.5 g t-BHP/11.4 g DIW) added to the reactor at a pump rate of 0.65 g/min, and simultaneously co-feed of 15.3 g iso-ascorbic acid (1.4 g IAA & 11.4 g DIW & 2.5 g NH₃ aq)) pumped at a rate of 0.77 g/min. Both lines were flushed with 5.7 g DIW. The reactor was then cooled to 25° C. and the emulsion was filtered through a 100 micron filter bag. The resulting emulsion had a pH of 8.0, an initially measured viscosity of 183,000 cPs, a measured solids of 46.2% and measured particle sizes of $D_v$=108 nm, $D_n$=78 nm.

A blend was then made using the emulsion in Example 8 and the resin of Example 4. The blend was made using a bench-top mixer equipped with a mixing blade. In a beaker, 548.3 g (22.6% solids) of Example 4 resin measured, over 15 min 250.0 g of the emulsion of Example 8 was added under agitation until the emulsion and resin became a homogenous solution. The resulting blend had a pH of 8.2, an initial measured viscosity of 6700 cPs, and measured solids of 30%.

Example 9

SMA-1000 (1560.0 g) and water (3737.3 g) were charged to a 2-gallon autoclave reactor. Ammonium hydroxide (28-29%, 702.3 g) was added to the reactor. The reactor was sealed and agitation begun at 250 RPM. The reactor was heated to a set-point of 110° C., and t=0 was defined when the reactor reached 108° C. 200 g samples were removed at the end of every hour for 8 hours. The reactor was cooled and held at 50° C. overnight. The next morning, heating was commenced again at 110° C., and hourly removal of 200 g samples was continued until an approximate total time of 14 hours cook. A final wet acid value of ~55.5 was measured for the last sample. Wet base values were invariant, coming in at 58.6 (mg KOH/g resin).

Example 10

Resin Cut (RC) Dispersion Blend A (MMA/EA:20/80): To a 1400-mL water-jacketed reactor equipped with a condenser, feed tube, thermocouple, and two three-blade impellers, water (57.77 g) and the autoclave resin cut of Example 9 (437.08 g) were charged. A nitrogen purge was begun and the contents of the reactor were heated to 80° C. Once the contents reached 80° C., ammonium persulfate (1.29 g) dissolved in water (7.37 g) was charged to the reactor, and the reactor was held at temperature for three minutes. A monomer feed composed of methyl methacrylate (MMA, 43.8 g) and ethyl acrylate (EA, 175.2 g) was fed into the reactor over 90 minutes. A secondary feed composed of ammonium persulfate (0.31 g) and water (32.85 g) began 45 minutes after the monomer feed began. The secondary feed was fed over 50 minutes. Reaction was then held at temperature for 30 minutes. After this 30-minute period, iron sulfate/EDTA complex (0.91 g) and tBHP (0.87 g) were charged to the reactor. Immediately after charging the tBHP, a feed, the reducing agent, composed of IAA acid (1.10 g), water (8.98 g), and ammonium hydroxide (1.7 g) was fed over 20 minutes. After this 20-minute feed, reaction was held at temperature for 10 minutes. The contents were cooled to 50° C., then filtered through a 150-mesh screen at temperature. Grit was negligible. Note: dispersion was too viscous to filter at room temperature. η>>100,000 cPs (spindle 4, 0.3 rpm, measured at 25° C.), Dv=246.5 nm, Dn=192.5 nm, Đ=1.28, Solids=41.18%.

Example 11

RC Dispersion Blend B1 (MMA/EA:20/80): The autoclave resin cut of Example 9 (353.34 g) was charged to a 1400-mL water-jacketed reactor equipped with a condenser, feed tube, thermocouple, and three three-blade impellers. A nitrogen purge was begun and the contents of the reactor were heated to 80° C. Once the contents reached 80° C., ammonium persulfate (1.04 g) dissolved in water (5.96 g) was charged to the reactor, and the reactor was held at temperature for three minutes. A monomer feed composed of methyl methacrylate (MMA, 35.4 g) and ethyl acrylate (EA, 141.6 g) was fed into the reactor over 90 minutes. A secondary feed composed of ammonium persulfate (0.25 g) and water (26.56 g) began 45 minutes after the monomer feed began. The secondary feed was fed over 50 minutes. The reaction was then held at temperature for 30 minutes. After this 30-minute period, iron sulfate/EDTA complex (0.75 g) and tBHP (0.70 g) was charged to the reactor. Immediately after the tBHP addition, a feed, the reducing agent, composed of IAA acid (0.90 g), water (7.28 g), and ammonium hydroxide (1.40 g) was fed over 20 minutes. After this 20-minute feed, the reactor kept at temperature. A 20-g sample was removed from the reactor for characterization. Due to the size of sample, pH, viscosity, and particle size were not measured. Solids=42.94%.

Example 12

RC Dispersion Blend C (BA:100): The process for was the same as previously described for RC Dispersion Blend A except the monomer feed was composed of only butyl acrylate (BA, 218.95 g). RC Dispersion Blend C was cooled to 25° C. after the final temperature hold and was filtered through a 150-mesh screen. Grit was negligible. η=2,439 cPs (spindle 4, 60 rpm). Dv=108.5 nm, Dn=92.7 nm, Đ=1.17, Solids=42.19%.

Example 13

RC Dispersion Blend D (BA:100): The autoclave resin cut of Example 9 (218.95 g) was charged to a 1400-mL water-jacketed reactor equipped with a condenser, feed tube, thermocouple, and three three-blade impellers. A nitrogen purge was begun, and the contents of the reactor were heated to 80° C. Once the contents reached 80° C., ammonium persulfate (0.96 g) dissolved in water (5.46 g) were charged to the reactor, and the reactor was held at temperature for three minutes. A monomer feed composed of butyl acrylate (BA, 162.2 g) was fed into the reactor for 90 minutes. A secondary feed composed of ammonium persulfate (0.23 g) and water (24.36 g) began 45 minutes after the monomer feed was started. The secondary feed was for 50 minutes. The reaction was then held at temperature for 30 minutes. After this 30-minute period, iron sulfate/EDTA complex (0.68 g) and tBHP (0.6 g) were charged to the reactor. Immediately after the tBHP addition, a feed, the reducing agent, composed of IAA acid (0.82 g), water (6.69 g), and ammonium hydroxide (1.20 g) was fed over 20 minutes. After this 20-minute feed, the reactor was kept at temperature. A 20-g sample was removed from the reactor for characterization. Due to the size of the sample, pH was not measured. η=18,596 cPs (spindle 4, 30 rpm), Dv=110.2 nm, Dn=90.9 nm, Đ=1.21, Solids=45.72%.

Example 14

RC Dispersion Blend E1 (MMA/EA/BA:10/40/50): Water (52.37 g) and the autoclave resin cut of Example 9 (322.51 g) was charged to a 1400-mL water-jacketed reactor equipped with a condenser, feed tube, thermocouple, and three three-blade impellers. A nitrogen purge was begun, and the contents of the reactor were heated to 80° C. Once the contents reached 80° C., ammonium persulfate (0.95 g) dissolved in water (5.46 g) was charged to the reactor, and the reactor was held at temperature for three minutes. A monomer feed composed of methyl methacrylate (MMA, 16.2 g), ethyl acrylate (EA, 64.6 g), and butyl acrylate (BA, 80.80 g) was fed into the reactor over 90 minutes. A secondary feed composed of ammonium persulfate (0.24 g) and water (24.31 g) was begun 45 minutes after the monomer feed began. The secondary feed was fed over 50 minutes. The reaction was then held at temperature for 30 minutes. After this 30-minute period, iron sulfate/EDTA complex (0.67 g) and tBHP (0.60 g) was charged to the reactor. Immediately after the tBHP addition, a feed, the reducing agent, composed of IAA acid (0.81 g), water (6.67 g), and ammonium hydroxide (1.20 g) was fed over 20 minutes. After this 20-minute feed, the reactor was kept at temperature. A 20-g sample was removed from the reactor for characterization. Due to the size of sample, pH was not measured. η=18,596 cPs (spindle 4, 30 rpm), Dv=126.5 nm, Dn=108.1 nm, Đ=1.17, Solids=41.39%.

Example 15

RC Dispersion Blend E2 (MMA/EA/BA:10/40/50): The process was the same as that previously described for Example 14. pH was not measured to be 8.8, Dv=135 nm, Dn=119 nm, Solids=33.2%.

Example 16

Back-blended Dispersion A2: At 50° C., RC Dispersion Blend A of Example 10 (230.0 g) was blended with the resin cut of Example 9 (323.6 g). Deionized water (5.4 g) and Calsoft L-40 (1.06 g, 20% active) were also blended in. The overall polymer solids was 34%, comprised of 58% resin, with 0.19 PHW of Calsoft.

Example 17

Back-blended Dispersion A1: At 50° C., RC Dispersion Blend A of Example 10 (230.0 g) was blended with the resin cut of Example 9 (323.6 g). Deionized water (17.7 g) and Calsoft L-40 (4.43 g, 20% active) were also blended in. The overall polymer solids was 33%, comprised of 58% resin, with 0.78 PHW of Calsoft.

Example 18

Back-blended Dispersion B1: At 85° C., RC Dispersion Blend B1 of Example 11 (203.6 g) was blended with the resin cut of Example 9 (300.0 g). Deionized water (10.80 g) and Calsoft L-40 (1.32 g, 20% active) were also blended in. The overall polymer solids was 33%, comprised of 65% resin, with 0.25 PHW of Calsoft.

Example 19

Back-blended Dispersion B2: At 85° C., RC Dispersion Blend B1 of Example 11 (579.0 g) was blended with the resin cut of Example 9 (853.1 g). Calsoft L-40 (5.98 g, 20% active) was also blended in. The overall polymer solids was 34%, comprised of 65% resin, with 0.42 PHW of Calsoft.

Example 20

Back-blended Dispersion C1: At 50° C., RC Dispersion Blend C of Example 12 (230.0 g) was blended with the resin cut of Example 9 (208.4 g). Deionized water (22.1 g) and Calsoft L-40 (1.16 g, 20% active) were also blended in. The overall polymer solids was 33%, comprised of 58% resin, with 0.25 PHW of Calsoft.

Example 21

Back-blended Dispersion C2: At 50° C., RC Dispersion Blend C of Example 12 (203.6 g) was blended with the resin cut of Example 9 (208.4 g). Deionized water (8.80 g) and Calsoft L-40 (4.48 g, 20% active) were also blended in. The overall polymer solids was 34%, comprised of 58% resin, with 1.0 PHW of Calsoft.

Example 22

Back-blended Dispersion C3: At 50° C., RC Dispersion Blend C of Example 12 (230.0 g) was blended with the resin cut of Example 9 (323.6 g). Calsoft L-40 (5.52 g, 20% active) was also blended in. The overall polymer solids was 33%, comprised of 65% resin, with 0.99 PHW of Calsoft.

Example 23

Back-blended Dispersion D: At 50° C., RC Dispersion Blend D of Example 13 (528.6 g) was blended with the resin cut of Example 9 (795.3 g). Calsoft L-40 (2.90 g, 20% active) was also blended in. The overall polymer solids was 34%, comprised of 65% resin, with 0.22 PHW of Calsoft.

Example 24

Back-blended Dispersion E1: At 50° C., RC Dispersion Blend E1 of Example 14 (577.0 g) was blended with the resin cut of Example 9 (636.0 g). To 315.4 g of the resultant blend, deionized water (1.5 g) and Calsoft L-40 (1.98 g) were also blended in. The overall polymer solids was 33.5%, comprised of 61.5% resin, with 0.63 PHW of Calsoft.

Example 25

Back-blended Dispersion E2: At 50° C., RC Dispersion Blend E2 of Example 15 (580.0 g) was blended with the resin cut of Example 9 (640.0 g). To 598.3 g of the resultant blend, deionized water (2.0 g) and Calsoft L-40 (3.71 g) were also blended in. The overall polymer solids was 33.5%, comprised of 61.5% resin, with 0.62 PHW of Calsoft.

Example 26

Characterization of back-blended dispersion blends from Examples 16-25 is shown in Table 1.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

TABLE 1

Exploration of Dispersion Blends

| Blend | Emulsion Monomer Composition (%) | | | Target solids % | Resin support level (%) | Calsoft L-40 level (%) | Viscosity (cPs) | | | | |
|---|---|---|---|---|---|---|---|---|---|---|---|
| | MMA | EA | BA | | | | 0 day | 1 day | 14 day | 21 day | 28 day |
| Disp. Blend $A_1$ | 20 | 80 | | 33 | 58 | 1.0 | 2.130 | 3.279 | 20.046 | 106.000 | 159.000 |
| Disp. Blend $A_2$ | 20 | 80 | | 34 | 58 | 0.25 | 4.589 | 11.558 | 141.000 | 451.000 | 770.000 |
| Disp. Blend $B_1$ | 20 | 80 | | 33 | 65 | 0.25 | 4.119 | 7.838 | 47.000 | 80.000 | 111.000 |
| Disp. Blend $B_2$ | 20 | 80 | | 34 | 65 | 1.0 | 4.079 | 14.297 | 63.000 | 136.000 | 128.000 |
| Disp. Blend $C_1$ | | | 100 | 33 | 58 | 0.25 | 149.5 | 117.0 | 96.5 | 106.5 | 200.5 |
| Disp. Blend $C_2$ | | | 100 | 34 | 58 | 1.0 | 206.5 | 137.0 | 145.0 | 219.0 | 261.5 |
| Disp. Blend $C_3$ | | | 100 | 33 | 65 | 1.0 | 271.4 | 220.5 | 221.0 | 324.5 | 305.0 |
| Disp. Blend D | | | 100 | 34 | 65 | 0.25 | 91.0 | 743.8 | 1.202 | 1.048 | 1.278 |
| Disp. Blend $E_1$ | 10 | 40 | 50 | 33.5 | 61.5 | 0.625 | 500 | 1.222 | 2.064 | 3.112 | 2.511 |
| Disp. Blend $E_2$ | 10 | 40 | 50 | 33.5 | 61.5 | 0.625 | 489.9 | 1.230 | 1.524 | 2.740 | 2.740 |

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An aqueous composition comprising
   (a) a solubilized cycloimide-containing resin formed from comonomers comprising maleic anhydride and substituted ethylenic comonomers, wherein
      (i) the resin comprises a cycloimide group and a partially neutralized maleamide-acid species; and
      (ii) the resin has an oxygen content of from about 5% to about 30%, an acid value of at least 60 mg KOH/g on dry solids, and an amine base value of at least 60 mg/KOH on dry solids;
      (iii) the resin has a number average molecular weight of about 1,000 D to about 10,000 D; and
      (iv) the substituted ethylenic comonomers comprise styrene; and
   (b) emulsion particles which constitute 0-80% weight of the total solids.

2. The aqueous composition of claim 1, wherein the ratio of styrene to maleic anhydride in the average molar repeat unit of the resin is from 1:1 to 5:1.

3. The aqueous composition of claim 1, wherein the substituted ethylenic comonomers further comprise $C_6$-$C_{20}$ α-olefins; the resin has a percentage of styrene in the substituted ethylenic comonomers of from 0% to 80%; and maleic anhydride is 33% to 50% of the average molar repeat unit of the resin.

4. The aqueous composition of claim 1, wherein the resin further comprises hydrolyzed diacid; the maleamide-acid species is partially neutralized by a neutralizing amine; the neutralizing amine comprises ammonia or a primary amine; and the resin has a degree of neutralization of the maleamide-acid species and the hydrolyzed diacid of at least 50%.

5. The aqueous composition of claim 2, wherein the resin has a degree of imidization of from about 25 mol % to about 75 mol % relative to the amount of maleic anhydride monomer present in the resin.

6. The aqueous composition of claim 2, wherein the resin has a degree of imidization of from about 25 mol % to about 50 mol % range relative to the amount of maleic anhydride monomer present in the resin.

7. The aqueous composition of claim 1, wherein the resin is formed from substituted ethylenic comonomers comprising acrylic acid, methacrylic acid, styrene, alpha-methyl styrene and maleic anhydride.

8. The aqueous composition of claim 1, wherein the emulsion particles are formed from initial polymerization of acrylate and styrenic monomers in the presence of a surfactant prior to blending with the resin.

9. The aqueous composition of claim 1, wherein the emulsion particles are formed from polymerization of acrylate and styrenic monomers in the presence of the resin.

* * * * *